United States Patent [19]

Cooke et al.

[11] 3,833,350

[45] Sept. 3, 1974

[54] METHOD OF INDUCING CAROTENOID ACCUMULATION IN PLANT TISSUE

[75] Inventors: Anson R. Cooke, Hatfield; Nancy E. Gallagher, Oreland, both of Pa.

[73] Assignee: Amchem Products, Inc., Ambler, Pa.

[22] Filed: Dec. 14, 1972

[21] Appl. No.: 315,760

[52] U.S. Cl.................. 71/98, 71/121, 426/268, 426/269, 426/270
[51] Int. Cl................................................ A01n 9/12
[58] Field of Search............................... 71/98, 121

[56] References Cited
UNITED STATES PATENTS 3,078,152  2/1963  Weiss et al............................ 71/121
3,142,554  7/1964  Godfrey................................. 71/98

*Primary Examiner*—James O. Thomas, Jr.
*Attorney, Agent, or Firm*—Ernest G. Szoke; Howard S. Katzoff; Michael E. Zall

[57] ABSTRACT

A method of inducing carotenoid synthesis or accumulation in plants, fruits, and vegetables by treating either before or after harvesting with halogenated phenoxytriethylamines or halogenated phenylthiotriethylamines.

22 Claims, No Drawings

METHOD OF INDUCING CAROTENOID ACCUMULATION IN PLANT TISSUE

BACKGROUND OF THE INVENTION

This invention relates to a novel method of increasing carotenoid, particularly lycopene content, by inducing carotenoid and lycopene synthesis or accumulation in plant tissue by applying to the plant an effective amount of a halogenated phenoxy- or halogenated phenylthio-triethylamine, or their acid addition salts. This method can be characterized as pH dependent and it has been found that, unexpectedly, the plant utilizes the halogenated phenoxy- or halogenated phenylthio-triethylamine primarily in the undissociated form. By using the method of this invention, the lycopene content in the fruit and certain other parts of a wide variety of plants may be significantly increased.

The halogenated phenoxy- or halogenated phenylthio-triethylamines used in the method of this invention are known compounds which have been used previously as herbicides for control and destruction of certain plant species and vegetation. For example, U.S. Pat. No. 2,952,678 discloses the preparation of halogenated phenoxy-alkyl substituted amines, including the phenoxy derivatives described herein. U.S. Pat. No. 3,078,152 discloses a method of destroying undesirable vegetation or nematodes employing 2-(p-chlorophenoxy)-triethylamine. Aryl-thioalkylamines have been utilized in the control or destruction of vegetation as disclosed in U.S. Pat. No. 3,142,554. Specifically, p-chlorophenyl-ω(N,N-diethylaminoethyl)sulfide has been included in synergistic herbicidal compositions, as disclosed in U.S. Pat. No. 3,287,101.

The carotenoids constitute the yellow to red fat-soluble pigments of plants. Carotenoids are found throughout the plant kingdom and responsibility for the color of many varieties of fruit, vegetables, and plants is attributed to them. In the case of fruit, the extent of color, specifically the depth of yellow, orange, or red, will indicate the degree of carotenoid accumulation and potential vitamin A value. The search for compositions that will modify pigmentation and increase carotenoid content in plant life has been an intriguing problem in the field of the agricultural sciences. Additionally, the induced production of a specific carotenoid in certain fruit and plants that do not normally produce that particular carotenoid represents a significant improvement, particularly where fruit coloration is an important factor.

Lycopene, which is the red pigment in, for example, the ripe fruit of the tomato, may be represented by the following formula:

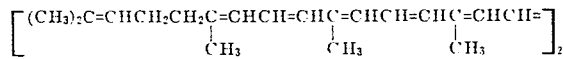

Without any intention of thereby limiting the scope of this invention, it is theorized that the compounds used in the method of this invention play the following described role in the carotenoid synthetic pathways in tomato fruit. It would appear that there are two separate pathways leading to β-carotene production in the tomato fruit.

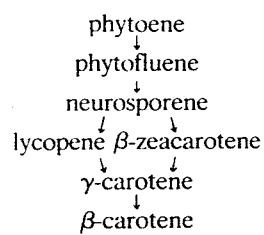

It also would appear that the main route of β-carotene synthesis in the tomato fruit is through β-zeacarotene rather than through lycopene. Thus, it is theorized that the compounds used in the method of this invention, by blocking the conversion of neurosporene to β-zeacarotene, permit accumulation of lycopene. There is not only a large increase in the amounts of lycopene accumulated, but there is also a general increase in the amount of the other acyclic carotenes.

In some plant systems, the compounds used in the method of this invention block further polyene synthesis after the phytoene stage, while in other plant systems they cause an increase in total polyene synthesis and stimulate the channeling of precursors to the phytoene level.

It is, therefore, an object of this invention to provide a practical method for increasing carotenoid content in growing plants or the harvested fruit of agronomic crops and other plant species. More specifically, it is an object of this invention to provide a facile method for increasing the lycopene content in plant tissue where lycopene is ordinarily found. Another object of this invention is to provide an artful method for producing lycopene in the tissue of plants that do not normally produce lycopene. Another object of this invention is to provide a method for modifying pigmentation of fruits and vegetables, thereby enhancing their color and improving their aesthetic appeal and marketability.

DETAILED DESCRIPTION

The method of this invention involves the application of a compound of the general formula:

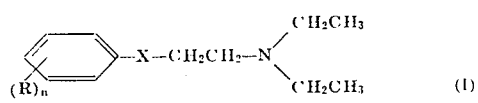

wherein X is either sulfur or oxygen; R is hydrogen or halogen, preferably chlorine; and n is an integer from 1 to 3, to viable plants or the fruit thereof.

Illustrative compounds answering the description of Formula I are, for example:
 2-phenylthio-triethylamine;
 2-(p-chlorophenylthio)-treithylamine;
 2-(o-chlorophenylthio)-treithylamine;
 2-(m-chlorophenylthio)-triethylamine;
 2-(2,3-dichlorophenylthio)-triethylamine; 2-(3,4-dichlorophenylthio)-triethylamine;
 2-(2,5-dichlorophenylthio)-triethylamine;
 2-(2,6-dichlorophenylthio)-triethylamine;
 2-(3,5-dichlorophenylthio)-triethylamine;
 2-(2,3,4-trichlorophenylthio)-triethylamine;
 2-(2,4,5-trichlorophenylthio)-triethylamine;
 2-(2,3,5-trichlorophenylthio)-triethylamine;
and the phenoxy derivatives corresponding to the specific compounds named above, where oxygen is substituted for sulfur in each case.

For the method disclosed in this invention, the preferred compounds of Formula I are those where R is chloro and $n$ is 1. Still more preferred are those where R is chloro, $n$ is 1, and the chloro is in the para position, namely, 2-(p-chlorophenylthio)-triethylamine and 2-(p-chlorophenoxy)-triethylamine.

Various acid addition salts of the compounds of Formula I are readily produced. For example, by adding hydrochloric acid to 2-(p-chlorophenylthio)-triethylamine, the hydrochloride salt is obtained. The acid addition salts of the compounds of this invention may be represented by the following structure:

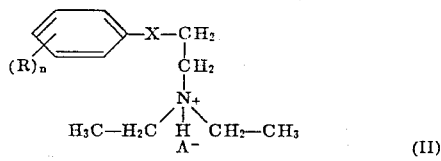

(II)

wherein X is either sulfur or oxygen; R is hydrogen or halogen, preferably chlorine; $A^-$ is the anion derived from the acid added to the amine to form a salt; and $n$ is an integer from 1 to 3. These salts are water soluble, of course, and provide an easy means of making aqueous solutions of the compounds of Formula I in various desired concentrations. However, a very important aspect of the method of this invention relates to the discovery that the activity of the compounds of Formula I is largely pH dependent, and more particularly that this activity requires pH's greater than 4, preferably in the range of from about 6 to about 11, and most preferably about 10. At pH's greater than about 11, injury to plant, and especially fruit tissue has been observed to occur. The uptake and utilization of the compounds of Formula I by plant, and especially fruit tissue is much greater when those compounds are in the amine form, as represented by Formula I, than when those compounds are in a dissociated salt form, as represented by Formula II. Some activity has been observed at lower pH's using the compounds of this invention in the salt form, represented by Formula II, as is shown by the results set out in Table I below. Uniformly good results, however, are obtained only at the higher pH's. It is conjectured that the plant or fruit tissue is able to take up and utilize small quantities of the compounds of this invention when they are in the salt form, represented by Formula II, at lower pH's by bringing the pH of the salt form of the compounds of this invention into adjustment with the higher pH which exists at the cellular level by means of the innate buffering system of the plant or fruit within the individual cell. At the higher pH, of course, the said salt form no longer exists, but instead becomes the amine form, represented by Formula I.

This phenomenon was not recognized until the discovery thereof, as described herein, and this phenomenon is contrary to the expectations to be derived from the present knowledge of plant physiology with respect to the compounds of Formulas I and II, and similar compounds.

The acid addition salts of the compounds of this invention, represented by Formula II, may be utilized in accordance with the method of this invention simply by adjusting the pH of an aqueous solution of the salt upwards by means of adding to the aqueous solution a sufficient amount of a commonly available base such as potassium hydroxide. Other bases, such as sodium hydroxide, ammonium hydroxide and various organic bases, may be substituted. Raising of the pH gradually induces formation of the amine form of the compounds of this invention, represented by Formula I. Since these amines are liquid at room temperature and relatively water insoluble, the clear aqueous solution becomes cloudy, indicating the formation and dispersion of the amine form. As is illustrated in the results set out in Table I, hereinbelow, an aqueous solution of a compound of Formula II in the acid addition salt form, when raised to the proper pH level, may be employed in the method of this invention to induce carotenoid, particularly lycopene synthesis or accumulation in plant and fruit tissue. To this aqueous solution may be added a small amount of wetting agent or surfactant, in order to increase the penetration into the tissue of the fruit, as well as to improve the flow characteristics of the solution. Preferably, a monoteric surfactant which is highly alkaline is employed. Such alkaline monoteric surfactants are, for example, Cy-Na50 and CA-35, available from Mona Industries, Inc., East Paterson, New Jersey.

The compounds used in the method of this invention may also be conveniently applied directly to the fruit or plant to be treated in the form of co-solvent solutions, emulsions, wettable powder dispersions, dust formulations, and the like.

The amine form of the compounds of this invention, as represented by Formula I, is that form apparently taken up and utilized by the plant or fruit tissue to give a response of significantly increased carotenoid content by way of synthesis or accumulation; but the amine form is also relatively water insoluble. Consequently, a satisfactory formulation of the amine which is easily diluted with water and applied to the plant or fruit to be treated employs a co-solvent which will dissolve the amine, but which is, in turn, itself water soluble or miscible. Such co-solvents are, for example, hexylene glycol and butoxyethanol. As with the acid addition salt solution, the pH of such a co-solvent solution is raised to the preferred range of pH values, for which the method of this invention has been observed, to achieve the optimum activity or response.

It is also possible to employ the compounds of this invention directly as the amine, represented by Formula I, by forming an emulsion. By dissolving the compounds in a water-immiscible "oil" or solvent, such as xylene, and adding an emulsifying agent, an emulsifiable concentrate is produced, which, when water is added, will give an emulsion ready for application to the plant or fruit to be treated. Here, too, the pH of the emulsion is raised to be within the preferred range, and most preferably to about 10, by adding to the emulsion sufficient amounts of a basic material.

The compounds of Formulas I or II can be formulated as wettable powders with conventional excipients, such as surfactants, fillers, and the like.

For dust formulations, the compounds used in the process of this invention may be absorbed onto solid carriers. Suitable carriers are, for example, vermiculite, attaclay, talc, and the like. Application of either the solid or liquid formulations to the locus of the plant is conveniently accomplished through the use of conventional application techniques and equipment.

For convenience, aqueous solutions and emulsions of the compounds of Formula I are prepared as liquid concentrates containing from about 0.1 to about 5 lbs./gal. and preferably about 2 lbs. per gallon. Such liquid concentrates are readily diluted to concentrations suitable for practical application at desired rates by simply adding water as required.

The compounds utilized as the active ingredients in the process of this invention are known compounds which can be prepared according to synthetic processes, described in the above identified patents, which are hereby incorporated by reference. Compounds of Formula I, not specifically disclosed therein, are readily obtainable by the same synthetic procedures employing analogous starting materials as will be clear to those skilled in the art.

For increasing the lycopene content of plant tissue, an effective amount of a compound of Formulas I or II in a suitable formulation may be applied directly to the growing plant or it can be applied post-harvest to the picked fruit. When applied to the growing plant, the formulation should be applied, preferably as a foliar spray, up to about 10 days before harvest, preferably 3 to 4 days before harvest. In the case of post-harvest treatment, spray application may also be utilized, though a dip or brush application is preferred. Such post-harvest treatment may take place at any time after harvest and before the fruit deteriorates. In the normal cycle of the plant, lycopene is accumulated only during the ripening stage of the fruit. Consequently, the method of this invention is most effective when used immediately before or after harvesting of the fruit. What is considered to be an effective amount of a compound of Formulas I or II to be applied will depend upon the particular plant species being treated and the stage of the plant's development when application is made. Ordinarily, however, an effective rate of application to growing plants is from about 5 to about 15 lbs./acre of active material applied in the form of a suitable aqueous solution containing a sufficient amount of water, such that the application rate in terms of total volume is from about 50 – 150 gallons/acre. The preferred method of application is directly to the fruit or to the foliage and/or stems of the plant.

For a post-harvest application to fruits or vegetables, the preferred method is a brush or dip application, employing an aqueous solution with a concentration from about 10 to about 5,000 ppm. and preferably about 100 ppm. For a dip application, only a few seconds soaking time are required at higher pH levels.

The compounds of Formulas I or II, particularly 2-(p-chlorophenylthio)-triethylamine and 2-(p-chlorophenoxy)-triethylamine, when applied to fruits and vegetables, induced lycopene accumulattion in the species treated, including some species in which lycopene had never been detected. The presence of lycopene was identified through the use of column chromatography with authentic lycopene, absorption spectrophotometry in four different solvents, and by observation of infrared and nuclear magnetic resonance spectra. Among the species of fruits treated were varieties of citrus, e.g., oranges, grapefruit, lemons, etc., peaches, apricots, nectarines, pineapples, and prunes.

The vegetables treated included tomatoes, carrots, sweet potatoes, and yams.

Some fruits were pretreated with particular growth regulators in order to observe the difference in response when a compound of Formulas I or II was added. Specifically, when certain fruits were pretreated with 2-chloroethylphosphonic acid followed by treatment with a compound of Formula I, a noted increase in the quantities of lycopene produced was observed as compared with the treatment of the fruit with a compound of Formula I alone. The fact that 2-chloroethylphosphonic acid growth regulators affect the magnitude of lycopene production, when used along with a compound of Formulas I or II, may be attributed to the production of ethylene in the plant in response to the 2-chloroethylphosphonic acid treatment.

The following examples will illustrate the application of the compounds and the response of the plant species. These examples are illustrative of the invention and are not to be considered as limiting for other compounds falling within the scope of this invention that might be substituted.

EXAMPLE I

The method of this invention was used to treat lemon fruit. Three fruit were used in each treatment and were soaked for 30 minutes in a 1 liter aqueous solution of 2-(p-chlorophenylthio)-treithylamine hydrochloride at a concentration of 500 ppm. by weight. The 500 ppm. concentration in tap water gave a pH of 5.5, and this pH was raised or lowered with either KOH or HCl, respectively. The pronounced effect of pH on the response obtained is clearly illustrated in the following Table I.

TABLE I

| Treatment | pH | Appearance of Solution | Response – Rind Color |
|---|---|---|---|
| Check | 6.0 | Clear | Yellow |
| 1 | 4.0 | Clear | Orange Spots |
| 2 | 5.0 | Clear | Mottled Orange |
| 3 | 6.0 | Clear | Uniform Orange |
| 4 | 7.0 | Slightly Cloudy | do. |
| 5 | 8.0 | Cloudy | do. |
| 6 | 9.0 | Cloudy | do. |
| 7 | 10.0 | Cloudy | do. |
| 8 | 11.0 | Cloudy, with precipitation | do. |

EXAMPLE II

In this Example, 2-(p-chlorophenylthio)-triethylamine was employed, both as the hydrochloride salt in aqueous solution, designated as S, and as the emulsified amine, designated as E. In addition, an alkaline monoteric surfactant was incorporated with the aqueous solution in several of the treatments. Lemon fruit was employed, with 3 fruit per treatment. One liter of solution or emulsion was used per treatment and the pH was adjusted to the indicated level with KOH and HCl. The results of the treatments are set out in Table II below.

pared with untreated control plugs. The results of treatment are illustrated in Table IV.

TABLE II

| Conc.—ppm By Wt. | Formulation | Surfactant | pH | Soak Time Minutes | Response — Rind Color |
|---|---|---|---|---|---|
| Check | — | — | 6.5 | 2 | Yellow |
| 100 | S | — | 10.0 | 2 | Uniform Orange |
| 100 | S | 0.1% | 10.0 | 2 | do. |
| 100 | S | — | 4.0 | 2 | Yellow — few Orange Spots |
| 100 | S | 0.1% | 4.0 | 2 | do. |
| 100 | S | — | 10.0 | 30 | Uniform Orange |
| 100 | S | 0.9% | 10.0 | 30 | do. |
| 100 | S | — | 4.0 | 30 | Yellow — few Orange Spots |
| 100 | S | 0.1% | 4.0 | 30 | Yellow |
| 1,000 | S | 0.5% | 10.0 | 30 | Uniform Orange |
| 100 | E | — | 6.0 | 2 | Mottled Orange |
| 1,000 | E | — | 7.0 | 30 | Uniform Orange |

It will be noted that when the pH was 4, that a soak time of 30 minutes failed to give a satisfactory response, whereas at a pH of 10, a uniform orange color was developed when the lemon fruit was treated with only a 2-minute soak.

EXAMPLE III 2-(p-chlorophenylthio)-triethylamine was applied to test species of grapefruit rind. The grapefruit were peeled and employing a common cork borer the grapefruit rind was bored to create discs or plugs 2 cm in diameter and 2 - 3 mm in thickness.

The plugs were placed in petri dishes and treated with 10 ml of aqueous test solution which had been adjusted to a pH of about 8. The petri dishes were allowed to stand at room temperature, under fluorescent light or in the dark, for 5 days and then the discs were observed for coloration. The differences in coloration of the plugs were compared with untreated control plugs.

The effects of treatment and the marked changes in color of the test species after treatment are illustrated in Table III.

TABLE III

| Concentration of Test Solution in ppm. | Effect in Light | Effect in Dark |
|---|---|---|
| 0—Control | Yellow (no effect) | Yellow (no effect) |
| 10 ppm | Slight Red-Orange Color | Yellow (no effect) |
| 50 ppm | Moderate Red-Orange Color | Yellow (no effect) |
| 100 ppm | Deep Red-Orange Color | Slight Red-Orange Color |
| 250 ppm | Deep Red-Orange Color | Slight Red-Orange Color |
| 500 ppm | Deep Red-Orange Color | Slight Red-Orange Color |
| 1,000 ppm | Deep Red-Orange Color | Slight Red-Orange Color |

EXAMPLE IV 2-(p-chlorophenylthio)-triethylamine was applied to test species of grapefruit and oranges. The rinds were prepared in the same manner as in Example III. The plugs were placed in petri dishes and were treated with 10 ml of test solution which had been adjusted to a pH of about 8. The petri dishes were allowed to stand at room temperature under fluorescent light.

The differences in coloration of the plugs were compared with untreated control plugs.

TABLE IV

| Concentration of Test Solution in ppm. | Grapefruit Rind | Orange Rind |
|---|---|---|
| 0—Control | Yellow (no effect) | Orange (no effect) |
| 1,000 ppm | Light Pink | Slightly more orange color than control |
| 5,000 ppm | Light Pink | Deeper red orange color than control |

EXAMPLE V 2-(p-chlorophenoxy)-triethylamine was applied to test species of grapefruit and oranges. The rinds were prepared in the same manner as in Example III. The plugs were placed in petri dishes and were treated with 10 ml of test solution which had been adjusted to a pH of about 8. The petri dishes were allowed to stand at room temperature under fluorescent light.

The differences in color of the discs were compared with untreated control discs. The results of treatment are illustrated in Table V.

TABLE V

| Concentration of Test Solution in ppm. | Grapefruit Rind | Orange Rind |
|---|---|---|
| 0—Control | Yellow (no effect) | Orange (no effect) |
| 1,000 ppm | Slight Pink Color | Orange (no effect) |
| 5,000 ppm | Moderate Red-Pink Color | Slight Red-Orange Color |

EXAMPLE VI 2-(p-chlorophenylthio)-triethylamine was applied both preharvest and post-harvest to certain test species of fruits and vegetables. In the pre-harvest treatment, the aqueous solution, which had been adjusted to a pH of about 8, was sprayed on the growing fruit or vegetable. In post-harvest treatment, the fruit or vegetable was dipped into the aqueous solution at the same pH.

The response of the test species varied as concentrations of the solution were increased from 10 ppm to 5,000 ppm. The preferred concentrations employed were from 200 ppm to 400 ppm.

2-(p-chlorophenylthio)-triethylamine induced lycopene accumulation in the test species as indicated in Table VI. For example, lycopene synthesis was found to have occurred in the pericarp or rind of the mature Marsh grapefruit. Lycopene had previously been detected in immature Marsh grapefruit, but not in the mature fruit.

In some of the test species, lycopene had never been detected before. When these fruits were observed after treatment, acyclic carotenoid accumulation (particularly lycopene) was discovered in both the flavedo (esocarp) and the albedo (mesocarp).

The results of the application of 2-(p-chlorophenylthio)-triethylamine on test species of fruits and vegetables are illustrated in Table VI.

TABLE VI

| Plant | Organ Treated | Tissue |
| --- | --- | --- |
| *Citrus paradisi*, Macf. | | |
| Marsh grapefruit | Fruit | Lycopene present in pericarp |
| Redblush grapefruit | Fruit | Lycopene present in pericarp |
| *C. sinensis*, (L.) Osbeck | | |
| Washington navel orange | Fruit | Lycopene present in pericarp |
| Valencia orange | Fruit | Lycopene present in pericarp |
| *C. limon*, (L.) Burm. f | | |
| Eureka lemon | Fruit | Lycopene present in pericarp |
| *C. unshiu*, Marcovitch | | |
| Satsuma mandarin | Fruit | Lycopene present in pericarp |
| *Lycopersicon esculentum*, Mill. | | |
| 4 non-lycopene producing strains | Fruit | Lycopene present in flesh |
| *Prunus persica*, L. | | |
| Dixie Red, White Nectar Golden Jubilee, Rochester | Fruit | Lycopene present in skin and flesh |
| Improved and Babcock Peach varieties and Le Grande nectarine | | |
| *Prunus domestica*, L. | | |
| Prune | Fruit | Lycopene present in flesh |
| *Prunus armeniaca*, L. | | |
| Apricot | Fruit | Lycopene present in flesh |
| *Daucus carota*, L. | | |
| Carrot | Root | Lycopene present throughout |
| *Ipomoea batatas*, (L.) Poir | | |
| Sweet Potato | Root | Lycopene present throughout |

We claim:

1. A method of increasing carotenoid content in plant tissue by applying to the said plant tissue an effective amount of a compound of the formula:

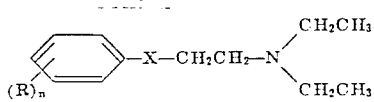

wherein R is either hydrogen or a halogen, X is either oxygen or sulfur, and $n$ is an integer from 1 to 3; or an acid addition salt thereof.

2. A method of increasing carotenoid content in plant tissue by applying to the said plant tissue an effective amount of 2-(p-chlorophenylthio)-triethylamine or an acid addition salt thereof.

3. A method of increasing carotenoid content in plant tissue by applying to the said plant tissue an effective amount of an aqueous solution of an acid addition salt of 2-(p-chlorophenylthio)-triethylamine.

4. A method of increasing carotenoid content in plant tissue by applying to the said plant tissue an effective amount of a composition consisting essentially of an aqueous emulsion of 2-(p-chlorophenylthio)-triethylamine, a solvent for the amine which is essentially insoluble in water, and an emulsifying agent.

5. A method of increasing carotenoid content in fruit tissue by applying to the fruit an aqueous composition containing an effective amount of a compound of the formula:

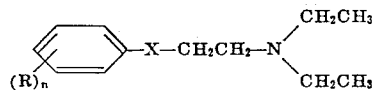

wherein R is either hydrogen or a halogen, X is either oxygen or sulfur, and $n$ is an integer from 1 to 3; or an acid addition salt thereof; wherein the said composition is at a pH greater than about 4.

6. The method of claim 5 wherein the pH is in the range of from about 6 to about 11.

7. The method of claim 5 wherein the pH is about 10.

8. A method of increasing carotenoid content in fruit tissue by applying to the fruit an aqueous composition containing an effective amount of 2-(p-chlorophenylthio)-triethylamine or an acid addition salt thereof; wherein the said composition is at a pH greater than about 4.

9. The method of claim 8 wherein the pH is in the range of from about 6 to about 11.

10. The method of claim 8 wherein the pH is about 10.

11. A method of increasing lycopene content in citrus fruit by applying to the fruit an aqueous composition containing an effective amount of 2-(p-chlorophenylthio)-triethylamine or an acid addition salt thereof; wherein the said composition is at a pH greater than about 4.

12. The method of claim 11 wherein the pH is in the range of from about 6 to about 11.

13. The method of claim 11 wherein the pH is about 10.

14. A method of increasing lycopene content in grapefruit by applying to the fruit an effective amount of 2-(p-chlorophenylthio)-triethylamine or an acid addition salt thereof; wherein the said 2-(p-chlorophenylthio)-triethylamine or its acid addition salt is at a pH of greater than about 4.

15. The method of claim 14 wherein the pH is in the range of from about 6 to about 11.

16. The method of claim 14 wherein the pH is about 10.

17. A method of increasing carotenoid content in fruit tissue by applying to the fruit an effective amount of a composition consisting essentially of an aqueous solution of an acid addition salt of 2-(p-chlorophenylthio)-triethylamine and an alkaline monoteric surfactant; wherein the said composition is at a pH greater than about 4.

18. A method of increasing carotenoid content in fruit tissue by applying to the fruit an effective amount of a composition consisting essentially of an aqueous emulsion of 2-(p-chlorophenylthio)-triethylamine, a solvent for the amine which is essentially insoluble in water, an emulsifying agent, and a base; wherein the said composition is at a pH greater than about 4.

19. The method of claim 18 wherein the solvent is xylene.

20. A method of increasing carotenoid content in fruit tissue by applying to the fruit an effective amount of a composition consisting essentially of a co-solvent aqueous solution of 2-(p-chlorophenylthio)-triethylamine, a solvent for the amine which is essentially soluble in water, and a base; wherein the said composition is at a pH greater than about 4.

21. The method of claim 20 wherein the solvent is hexylene glycol.

22. The method of claim 20 wherein the solvent is butoxyethanol.

* * * * *